(12) United States Patent
Ryerson et al.

(10) Patent No.: US 8,548,680 B2
(45) Date of Patent: Oct. 1, 2013

(54) STEERING SYSTEM WITH AUTOMATED ARTICULATION CONTROL

(75) Inventors: Cody J. Ryerson, Peoria, IL (US); Phillip A. Newberry, Taylorville, IL (US); Yongliang Zhu, Dunlap, IL (US); Bruce Wiewel, East Peoria, IL (US); Vivek Bhaskar, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 837 days.

(21) Appl. No.: 12/535,778

(22) Filed: Aug. 5, 2009

(65) Prior Publication Data
US 2011/0035109 A1 Feb. 10, 2011

(51) Int. Cl.
*B62D 115/00* (2006.01)

(52) U.S. Cl.
USPC .............. 701/41; 180/235; 280/426; 280/442

(58) Field of Classification Search
USPC .................. 701/41, 42, 50, 23; 180/204, 6.2, 180/6.24, 14.2, 16, 233, 234, 235, 400, 418, 180/419; 280/400, 426, 442
See application file for complete search history.

(56) References Cited

U.S. PATENT DOCUMENTS

| | | | | |
|---|---|---|---|---|
| 3,905,446 A * | 9/1975 | Ross | ............... | 181/114 |
| 4,320,811 A * | 3/1982 | Queveau | .................. | 180/14.3 |
| 4,344,640 A * | 8/1982 | Ratsko et al. | ............... | 280/432 |
| 4,351,408 A * | 9/1982 | Moll | .............. | 180/419 |
| 4,373,603 A * | 2/1983 | Nelson | ............... | 180/236 |
| 4,565,257 A * | 1/1986 | Hanson | ............... | 180/419 |
| 4,616,841 A * | 10/1986 | Reichl et al. | ................... | 280/432 |
| 4,688,818 A * | 8/1987 | Grassmuck | ................... | 280/432 |
| 4,809,805 A * | 3/1989 | Short | .................. | 180/420 |
| 5,209,320 A * | 5/1993 | Harrer | ............................ | 180/235 |
| 5,379,220 A * | 1/1995 | Allen et al. | ................... | 701/41 |
| 5,427,195 A * | 6/1995 | Paul et al. | .................... | 180/308 |
| 5,479,999 A | 1/1996 | Proia | | |
| 5,732,789 A * | 3/1998 | Stephenson | ................ | 180/418 |
| 5,899,292 A * | 5/1999 | Paul et al. | .................... | 180/419 |
| 5,908,081 A * | 6/1999 | Olson | ................ | 180/419 |
| 5,987,383 A * | 11/1999 | Keller et al. | ................... | 701/50 |
| 6,009,969 A * | 1/2000 | Salcher et al. | .............. | 180/249 |
| 6,039,133 A * | 3/2000 | Zulu | ............. | 180/6.64 |
| H1846 H * | 4/2000 | Poorman | ..................... | 180/418 |
| 6,152,237 A | 11/2000 | Hartman et al. | | |
| 6,152,239 A * | 11/2000 | Kelley et al. | .................. | 172/4.5 |
| 6,174,255 B1 * | 1/2001 | Porter et al. | ............... | 475/84 |
| 6,247,510 B1 * | 6/2001 | Diekhans et al. | ............ | 141/231 |
| 6,266,596 B1 * | 7/2001 | Hartman et al. | ............... | 701/50 |
| 6,299,181 B1 * | 10/2001 | Ericksson | ................. | 280/6.156 |
| 6,612,101 B2 * | 9/2003 | Dillon | ............................ | 56/14.6 |
| 6,907,336 B2 * | 6/2005 | Gray et al. | ..................... | 701/50 |

(Continued)

FOREIGN PATENT DOCUMENTS

DE 102007025969 * 12/2008
JP 2003237619 A * 8/2003

*Primary Examiner* — Thomas Black
*Assistant Examiner* — Ce Li
(74) *Attorney, Agent, or Firm* — Michael Braunstein (57) ABSTRACT

An articulated machine and method of operation, the articulated machine having a first frame with a first traction device and a steering apparatus that controls a steering angle thereof, the first frame pivotally coupled to a second frame at an articulation joint, the second frame having a second traction device, a steering sensor configured to provide a steering signal indicative of the steering angle, and an electronic controller configured to automatically control an articulation angle based on the steering signal.

18 Claims, 6 Drawing Sheets

(56) References Cited

U.S. PATENT DOCUMENTS

| | | | |
|---|---|---|---|
| 7,325,636 B2* | 2/2008 | Yeoman et al. | 180/62 |
| 7,588,088 B2* | 9/2009 | Zachman | 172/4.5 |
| 7,766,104 B2* | 8/2010 | Newberry et al. | 180/24.09 |
| 8,060,299 B2* | 11/2011 | Gharsalli et al. | 701/425 |
| 2002/0017087 A1* | 2/2002 | Dillon | 56/14.6 |
| 2002/0027025 A1* | 3/2002 | Kobayashi et al. | 180/6.2 |
| 2004/0093139 A1* | 5/2004 | Wildey et al. | 701/41 |
| 2004/0193348 A1* | 9/2004 | Gray et al. | 701/50 |
| 2005/0146115 A1* | 7/2005 | Vigholm et al. | 280/426 |
| 2005/0288834 A1* | 12/2005 | Heiniger et al. | 701/23 |
| 2006/0042838 A1* | 3/2006 | Yeoman et al. | 180/6.2 |
| 2007/0216134 A1* | 9/2007 | Padula | 280/443 |
| 2007/0250236 A1* | 10/2007 | Newberry et al. | 701/51 |
| 2008/0000659 A1* | 1/2008 | Zachman | 172/797 |
| 2008/0041655 A1* | 2/2008 | Breiner et al. | 180/418 |
| 2008/0135322 A1* | 6/2008 | Smith et al. | 180/338 |
| 2008/0208461 A1* | 8/2008 | Gharsalli et al. | 701/209 |
| 2011/0270497 A1* | 11/2011 | Uematsu et al. | 701/50 |
| 2011/0276211 A1* | 11/2011 | Teraya | 701/22 |

* cited by examiner

STEERING SYSTEM WITH AUTOMATED ARTICULATION CONTROL

TECHNICAL FIELD

This disclosure relates generally to the art of earth moving equipment, more particularly to a steering control system for a motor grader that automatically controls articulation of the machine based on the front wheel steering angle.

BACKGROUND

Motor graders are earth-moving machines that are generally employed as a finishing tool to sculpt a surface of a construction site or roadway to a final shape and contour. Motor graders typically include a front frame and a rear frame that are joined at an articulation joint. The rear frame includes compartments for housing the power source and cooling components, the power source being operatively coupled to the rear wheels for primary propulsion of the machine, the rear wheels being arranged in tandems on opposing sides of the rear frame. The front frame includes a pair of front wheels, and supports an operator station and a blade assembly. The blade can be rotated, tilted, raised and lowered, and shifted side to side to a virtually limitless number of positions. Steering of the machine is a function of both front wheel steering and articulation of the front frame relative to the rear frame.

As should be recognized from the above, motor graders are one of the most complex types of heavy machinery to operate, including numerous hand-operated controls to steer the front wheels, position the blade, control articulation, control auxiliary devices such as rippers and plows, and various displays for monitoring machine conditions and/or functions. It requires highly skilled and focused operators to position the blade while controlling steering, particularly when performing curved path grading, cul-de-sac grading, and driving in reverse.

For example, in cul-de-sac grading, the operator is required to maneuver the motor grader around a substantially circular path while maintaining the blade at a desired distance from curbs and other obstacles. This requires that operators simultaneously control the blade, front wheel steering and articulation. Failure to properly control articulation in such instances results in the front and rear portions of the machine following separate travel paths, which can cause obstacle collisions or incomplete grading requiring multiple passes.

U.S. Pat. No. 6,152,237 to Hartman et al. discloses a method for automatically rotating a motor grader to a predetermined articulation angle. A controller obtains a present articulation angle from a displacement sensor, and, upon receiving an operator control signal, the controller is configured to articulate the motor grader from the present articulation angle to a pre-programmed articulation angle, such as a maximum right articulation angle, a maximum left articulation angle, and/or a neutral articulation angle. While this system does assist operators by providing a method of achieving a specific motor grader travel configuration with minimal operator input, during which time the operators can focus on blade control or other machine operations, it does not assist operators in maneuvering the vehicle for curved grading.

The present disclosure is directed to a steering control system and method to improve motor grader operations that addresses one or more of the problems or shortcomings set forth above.

SUMMARY

In one aspect, the present disclosure provides an articulated machine having a first frame with a first traction device and a steering apparatus operable to control a steering angle thereof. A second frame is pivotally coupled to the first frame at an articulation joint, the second frame having a second traction device. A steering sensor is configured to provide a steering signal indicative of the steering angle with an electronic controller configured to automatically control an articulation angle of the first frame relative to the second frame based on the steering angle.

In another embodiment, a method of operating a motor grader is provided that includes selecting an automatic articulation mode, propelling the motor grader along a direction of travel, commanding front wheel steering to turn the motor grader, and providing a front wheel steering signal to an electronic controller that automatically commands articulation of a front frame relative to a rear frame of the machine about an articulation joint in response to the front wheel steering signal.

In yet another embodiment, provided is a motor grader that includes a front frame having first and second steerable wheels disposed on opposing sides of the front frame, and a rear frame pivotally coupled to the front frame at an articulation joint. The rear frame includes a tandem with two rear wheels pivotally connected on opposing sides thereof. A steering sensor is configured to provide a steering signal indicative of a steering angle of the first and second steerable wheels, an electronic controller configured to automatically command the first and second articulation cylinders to control an articulation angle of the front frame relative to the rear frame based on the steering angle.

These and other aspects and advantages of the present disclosure will become apparent to those skilled in the art upon reading the following detailed description in connection with the drawings and appended claims.

DETAILED DESCRIPTION

Reference will now be made in detail to exemplary embodiments that are illustrated in the accompanying drawings. Whenever possible, the same reference numbers will be used throughout the drawings to refer to the same or like parts.

Figure 1:
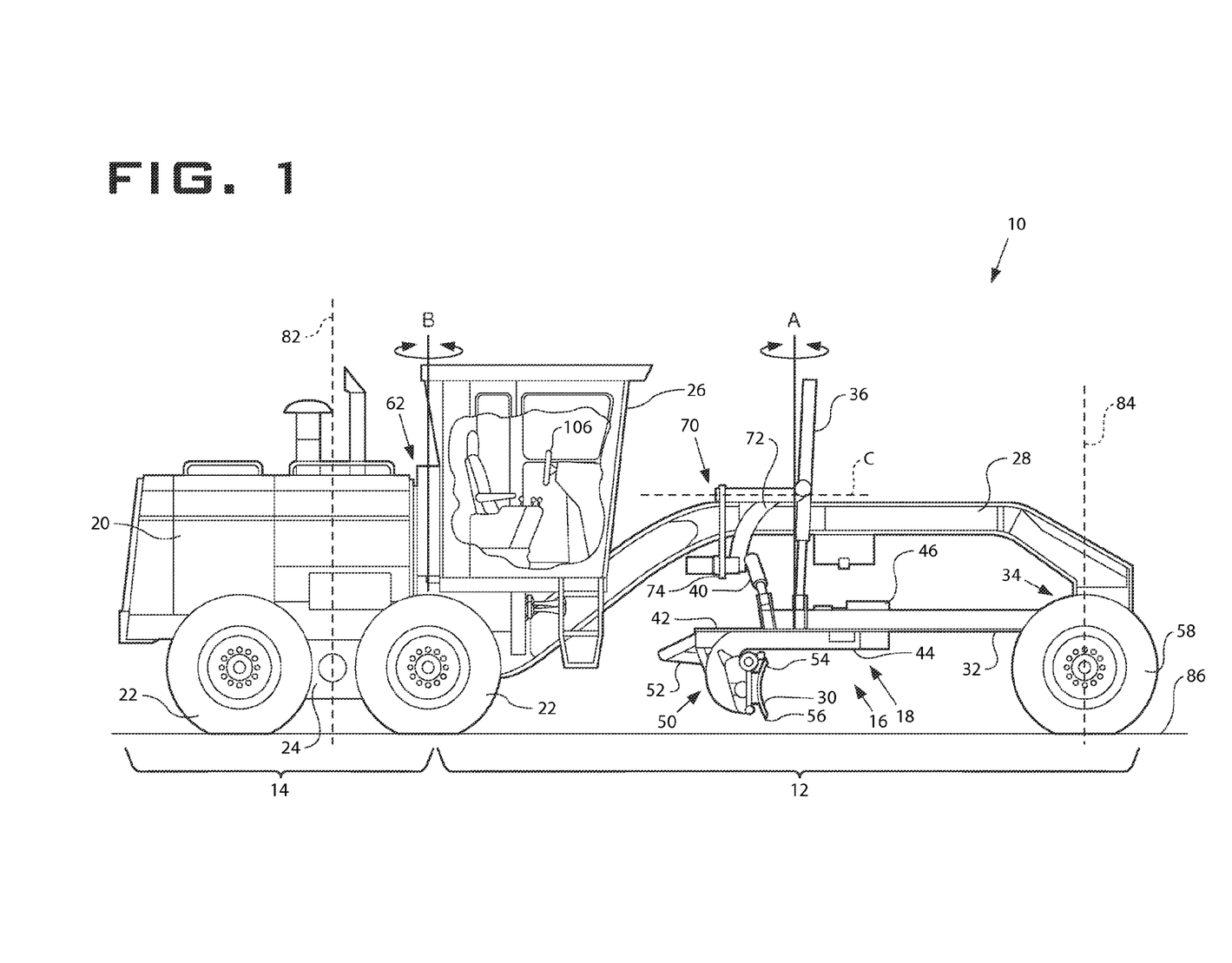
FIG. 1 is a pictoral representation of a side view of an exemplary motor grader.
Figure 2:
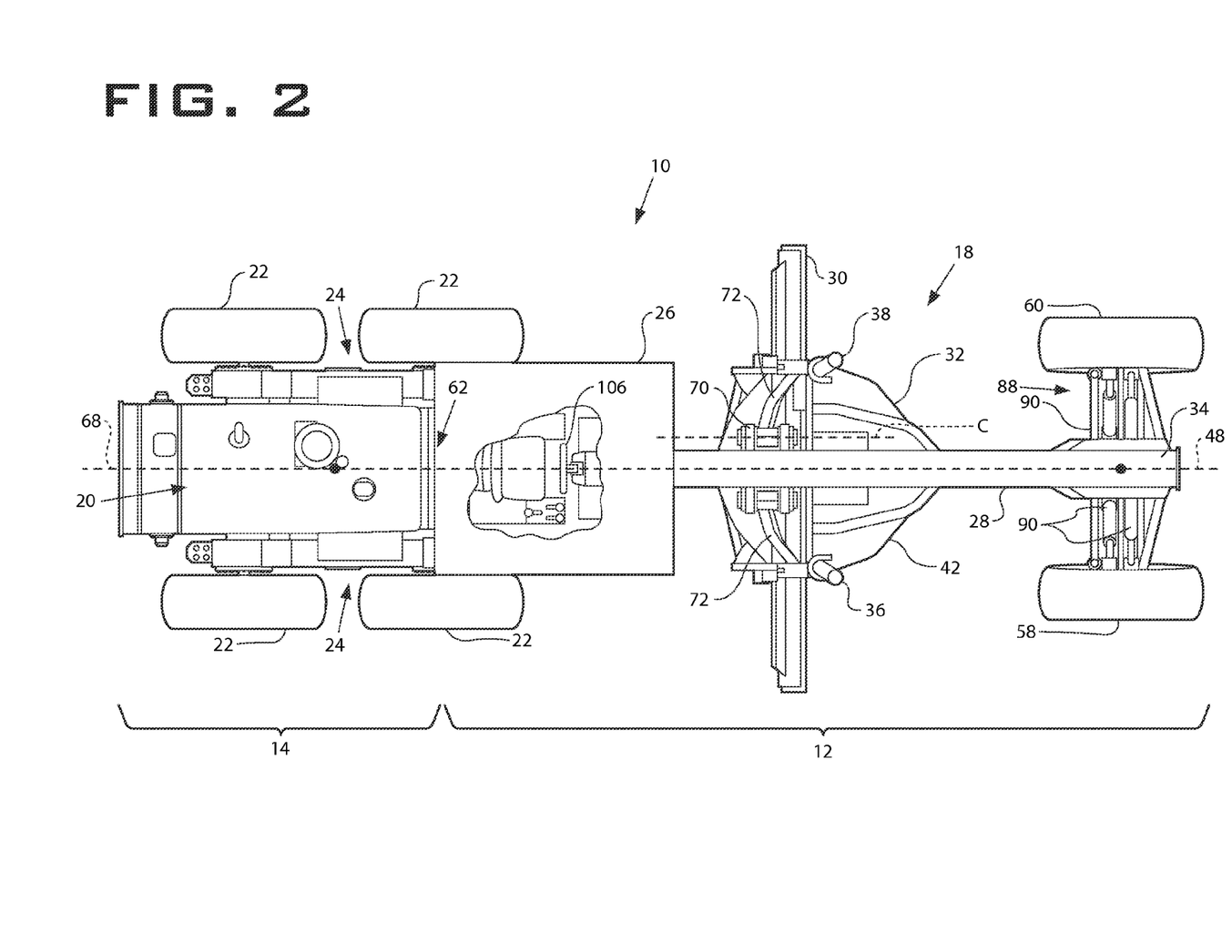
FIG. 2 is a pictoral representation of a top view of an exemplary motor grader.

Referring to FIG. 1 and FIG. 2, there is shown an earth-moving machine in accordance with one embodiment of the present disclosure. The machine is shown in the context of a motor grader 10 having a front frame 12, rear frame 14, and a work implement 16, that, in the context of a motor grader, is typically a blade assembly 18, also referred to as a drawbar-circle-moldboard assembly (DCM). The rear frame 14 includes a power source (not shown), contained within a rear compartment 20, that is operatively coupled through a transmission (not shown) to rear traction devices or wheels 22 for primary machine propulsion. As shown, the rear wheels 22 are operatively supported on tandems 24 which are pivotally connected to the machine between the rear wheels 22 on each side of the motor grader 10. The power source may be, for example, a diesel engine, a gasoline engine, a natural gas engine, or any other engine known in the art. The power source may also be a fuel cell, power storage device, or another source of power known in the art. The transmission may be a mechanical transmission, hydraulic transmission, or any other transmission type known in the art. The transmission may be operable to produce multiple output speed ratios (or a continuously variable speed ratio) between the power source and driven traction devices.

The front frame 12 supports an operator station 26 that contains the many operator controls, along with a variety of displays or indicators used to convey information to the operator, used for primary operation of the motor grader 10. The front frame 12 also includes a beam 28 that supports the blade assembly 18 that is employed to move the blade 30 to a wide range of positions relative to the motor grader 10. The blade assembly 18 includes a drawbar 32 pivotally mounted to a first end 34 of the beam 28 via a ball joint (not shown). The position of the drawbar 32 is controlled by three hydraulic cylinders: a right lift cylinder 36 and left lift cylinder 38 that control vertical movement, and a center shift cylinder 40 that controls horizontal movement. The right and left lift cylinders 36,38 are connected to a coupling 70 that includes lift arms 72 pivotally connected to the beam 28 for rotation about axis C. A bottom portion of the coupling 70 has an adjustable length horizontal member 74 that is connected to the center shift cylinder 40.

The drawbar 32 includes a large, flat plate, commonly referred to as a yoke plate 42. Beneath the yoke plate 42 is a circular gear arrangement and mount, commonly referred to as the circle 44. The circle 44 is rotated by, for example, a hydraulic motor referred to as the circle drive 46. Rotation of the circle 44 by the circle drive 46 rotates the attached blade 30 about an axis A perpendicular to a plane of the drawbar yoke plate 42. The blade cutting angle is defined as the angle of the blade 16 relative to a longitudinal axis 48 of the front frame 12. For example, at a zero degree blade cutting angle, the blade 30 is aligned at a right angle to the longitudinal axis 48 of the front frame 12 and beam 28.

The blade 30 is also mounted to the circle 44 via a pivot assembly 50 that allows for tilting of the blade 30 relative to the circle 44. A blade tip cylinder 52 is used to tilt the blade 30 forward or rearward. In other words, the blade tip cylinder 52 is used to tip or tilt a top edge 54 relative to the bottom cutting edge 56 of the blade 30, which is commonly referred to as blade tip.

The blade 30 is also mounted to a sliding joint associated with the circle 44 that allows the blade 30 to be slid or shifted from side-to-side relative to the the circle 44. The side-to-side shift is commonly referred to as blade side shift. A side shift cylinder (not shown) is used to control the blade side shift.

Motor grader steering is accomplished through a combination of both front wheel steering and machine articulation. In FIG. 2, associated with the first end 34 of the beam 28 are steerable traction devices, right and left wheels 58,60. Wheels 58,60 may be both rotatable and tiltable for use during steering and leveling of a work surface 86. Front wheels 58,60 are connected via a steering apparatus 88 that may include a linkage 90 and a hydraulic cylinder (not shown) for rotation about front wheel pivot points 80, FIG. 3, and tilt cylinders 92 for front wheel tilt. Front steerable 58,60 and/or rear driven traction devices 22, may include tracks, belts, or other traction devices as an alternative to wheels as is known in the art. The front wheels 58,60 may also be driven, as is the case in motor graders provided with all wheel drive. For example, the power source may be operatively connected to a hydraulic pump (not shown) fluidly coupled to one or more hydraulic motors (not shown) associated with the front wheels 58,60.

Figure 3:
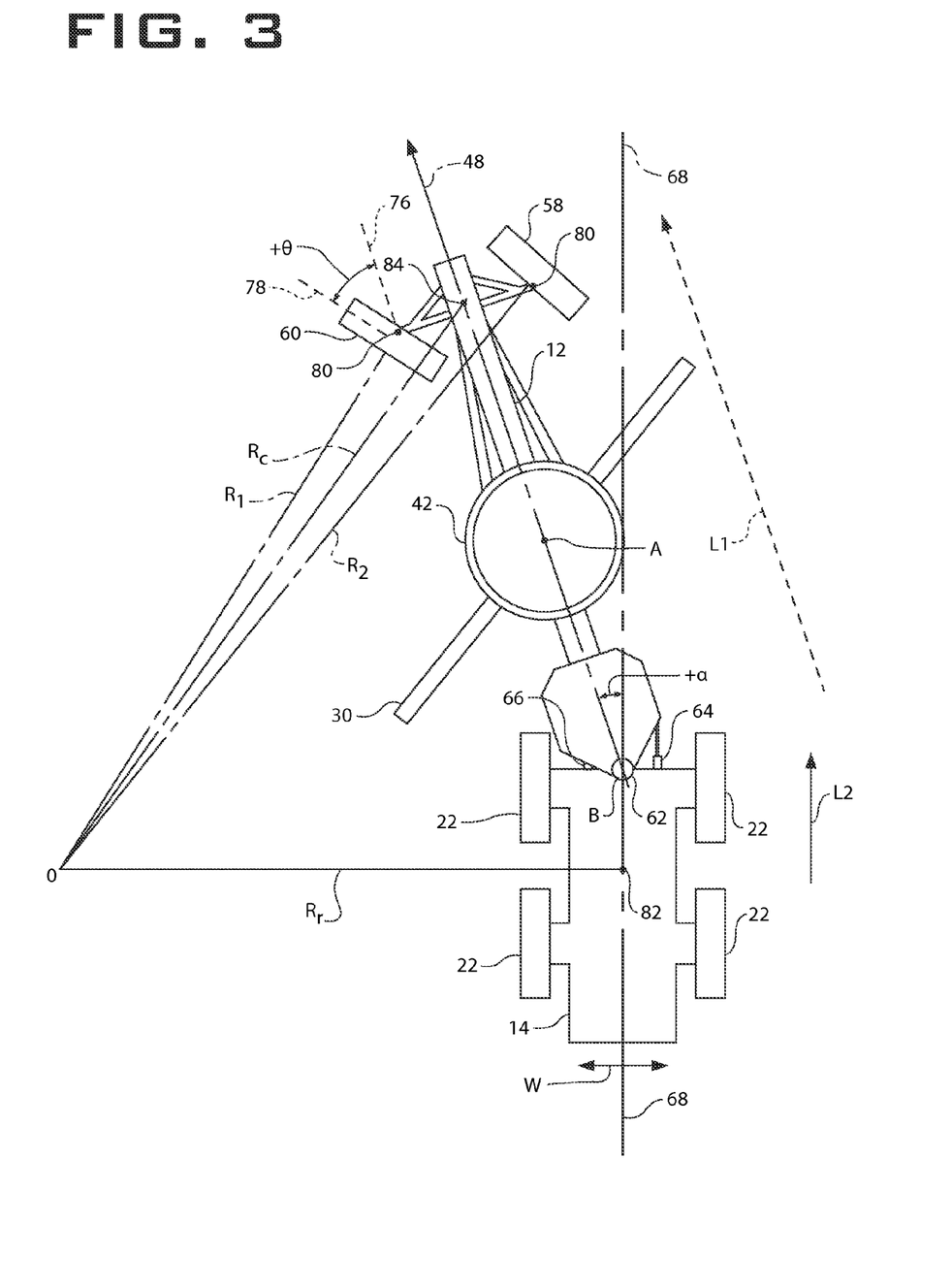
FIG. 3 is a diagrammatic illustration of a top view of an exemplary motor grader illustrating steering and articulation angles.

Referring to FIGS. 1 and 3, the motor grader 10 includes an articulation joint 62 that pivotally connects front frame 12 and rear frame 14. Both a right articulation cylinder 64 and left articulation cylinder 66 are connected between the front frame 12 and rear frame 14 on opposing sides of the machine 10. The right and left articulation cylinders 64,66 are used to pivot the front frame 12 relative to the rear frame 14 about an articulation axis B. In FIG. 2, the motor grader 10 is positioned in the neutral or zero articulation angle position wherein the longitudinal axis 48 of the front frame 12 is aligned with a longitudinal axis 68 of the rear frame 14.

FIG. 3 is a top view of a motor grader 10 with the front frame 12 rotated at a articulation angle $+\alpha$ defined by the intersection of longitudinal axis 48 of front frame 12 and longitudinal axis 68 of the rear frame 14, the intersection corresponding with the position of articulation joint 62. In this illustration a positive $\alpha$ is indicative of a left articulation from the perspective of an operator facing forward, while a negative $\alpha$ (not shown) would be indicative of a right articulation. A front wheel steering angle $+\theta$ is defined between a longitudinal axis 76 parallel to the longitudinal axis 48 of front frame 12, and a longitudinal axis 78 of the front wheels 58, 60, the angle $\theta$ having an origin at a pivot point 80 of the front wheels 58, 60. This is demonstrated in connection with left front wheel 60, but equally applies to right front wheel 58.

Figure 4:
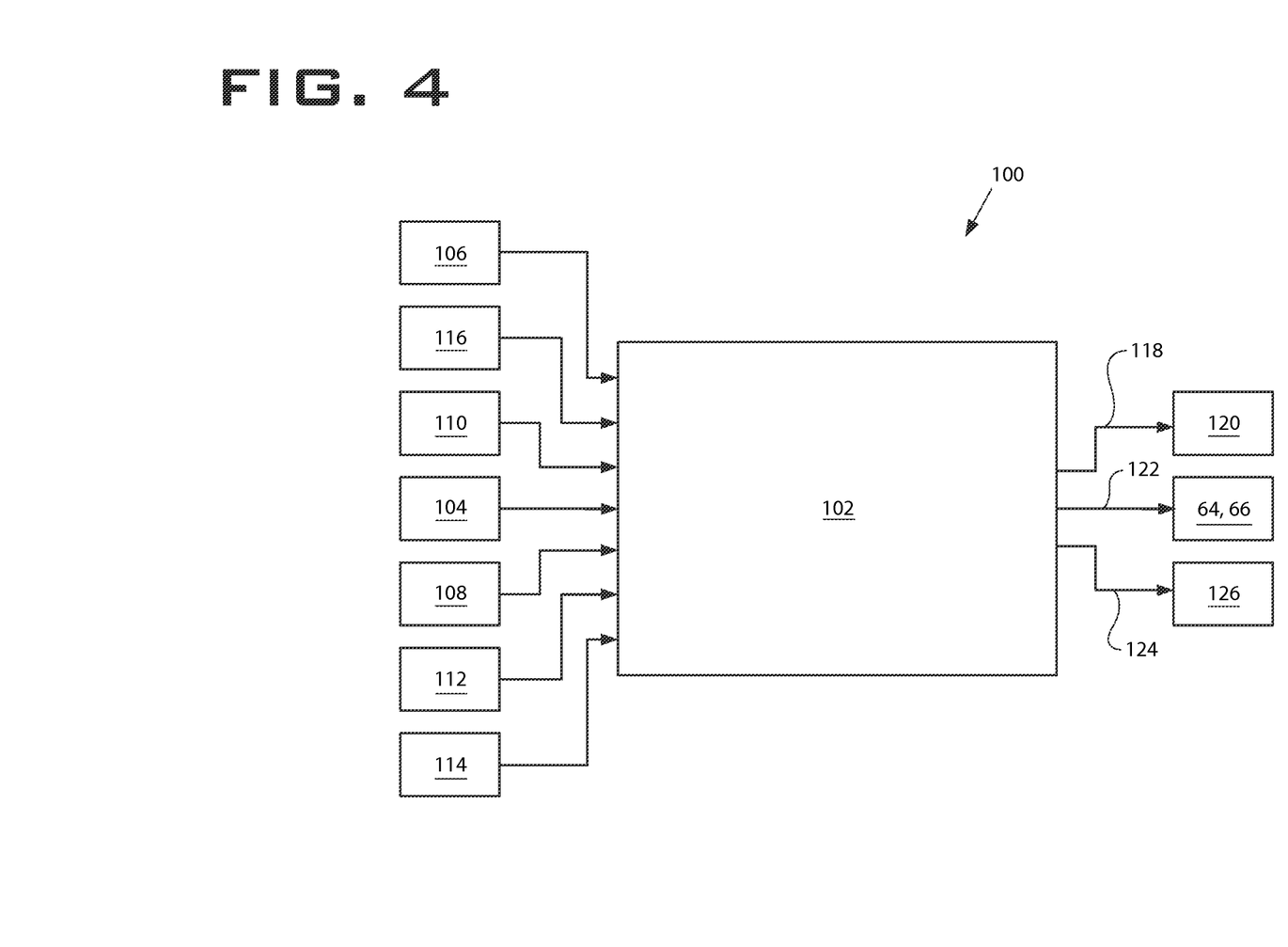
FIG. 4 is a block diagram of an exemplary steering control system.

FIG. 4 is a block diagram of an exemplary steering control system 100 in accordance with one embodiment of the disclosure. The control system generally includes an electronic controller 102 configured, for example, via a control algorithm, to receive a plurality of signals from various sensors and/or operator commands, and to responsively provide signals to control various machine actuators and/or communicate with the machine operator. Controller 102 may thus include various components for running software applications designed to regulate various subsystems of machine 10. For example, controller 102 may include a central processing unit (CPU), a random access memory (RAM), input/output (I/O) elements, etc.

The control system 100 is configured to control machine articulation based upon operator control of front wheel steering. Accordingly, the controller 102 is configured to receive an indication of the front wheel steering angle $\theta$. In one embodiment, the motor grader includes one or more steering angle sensors 104 that may be associated with one or both of the right and left front wheels 58,60. In one embodiment, the wheel angle sensor 104 is configured to monitor the wheel steering angle $\theta$ by monitoring angles or rotation of steering linkages and/or pivot points at the front wheels 58,60. In another exemplary embodiment, the wheel angle sensor 104 is configured to monitor the wheel steering angle by measuring the extension amount of an actuator (not shown), such as a hydraulic actuator, that controls the steering of front wheels 58,60. Other sensor configurations are well known in the art. The steering sensors 104 may provide a signal "indicative of" the steering angle, which should be understood to mean direct measurements of the quantity or characteristic of interest, as well as indirect measurements, for example of a different quantity or characteristic having a known relationship with the quantity or characteristic of interest.

In yet another embodiment, the controller 102 may be configured to receive a signal from one or more operator steering controls 106 that may be employed to provide an indication of steering angle θ. These controls 106 may be, for example, a steering wheel as shown in FIGS. 1-2, or any other type of operator input device, such as a dial, joystick, keyboard, pedal or other devices known in the art. In one embodiment, for example, a steering wheel sensor may be provided that senses the rotation or position of the steering wheel to provide an indication of steering angle θ.

Similarly, one or more articulation sensors 108 may be employed to provide an indication of the articulation angle α at the axis B between the rear frame 14 and front frame 12. In one exemplary embodiment, the articulation sensor 108 is a pivot sensor disposed at articulation joint 62 to sense rotation at articulation axis B. In another exemplary embodiment, the articulation sensor 108 may configured to monitor the extension of right and/or left articulation cylinders 64,66. Steering angle sensors 104 and articulation sensors 108 could be any type of sensor known in the art, including, for example, potentiometer, extension sensors, proximity sensors, angle sensors and the like.

Other inputs that may be associated with the steering control system 100 may include signals provided from a mode selector 110 disposed, for example, in operator station 20, machine speed sensors 112, and transmission sensors 114. The mode selector 110 may be employed to select amongst various modes of operation including, for example, a standard operating mode, an automatic tracking mode, and a tracking mode with steering angle limits, discussed in more detail below. Machine speed sensors 112 may be any sensor configured to monitor machine travel speed, for example, sensors associated with any of the front wheels, rear wheels, axle shafts, motors, or other components of the drive train. A transmission sensor 114 may be associated with the transmission to provide an indication of a current gear or output ratio. Alternatively, an indication of current gear or output ratio may be provided by signals associated with operator controls for the transmission (not shown).

Figure 6:
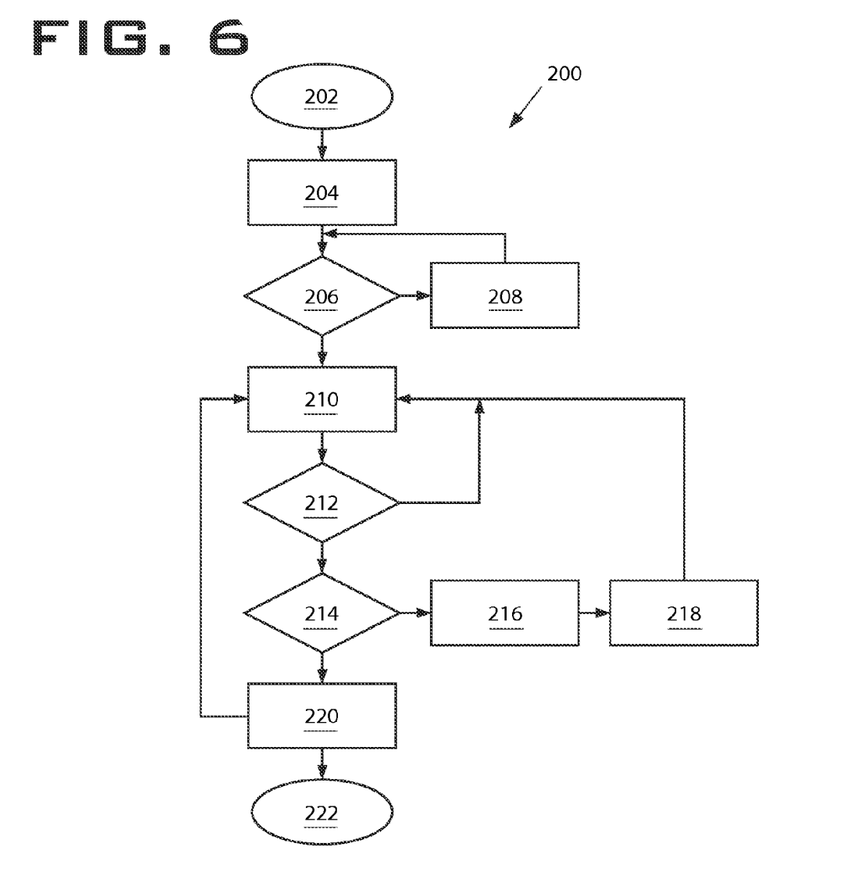
FIG. 6 is a flow diagram of an exemplary method operation of a steering control system.

Referring to FIG. 6, there is shown an exemplary process 200 for operation of the steering control system 100 outlined in FIG. 4. Control process 200 will typically begin at START 202 wherein the operator has started the machine for performing a grading operation that may include a curved travel path and contour, such as in a cul-de-sac operation shown in FIG. 7. During standard machine operations, the operator may manually operate both the steering controls 106 and articulation controls 116 to maneuver motor grader 10. Operator steering control signals may be provided indirectly through the controller 102 that responsively provides steering control signals 118, FIG. 4, to control steering actuators 120. Similarly, operator articulation controls 116 may provide articulation signals to the controller 102 that responsively provides articulation control signals 122 to control articulation actuators 64,66. Such control signals may be, for example, pilot or electro-hydraulic signals that control operation of one or more pumps, motors, or valves of a hydraulic system that operates steering actuators 120, 64 or 66 as is well known in the art.

At STEP 204, the operator may select a mode of operation for the steering control system 100. For example, mode selector 110 may allow the operator to select between a standard mode of operation, described above, an automatic articulation control mode, or an articulation control mode with steering limits. For example, mode selector 110 may be a two or three position toggle switch or dial disposed in the operator station 20.

If the operator has selected either of the automatic articulation control modes, at STEP 206 the system may determine whether the machine is within a desired speed range or desired transmission gear or ratio to engage automatic articulation control. Controller 102 may be configured to receive signals indicative of a travel speed of the machine from one or more machine speed sensors 112 which the controller 102 may be configured to compare to a predetermined maximum speed or speed range. In the event that actual travel speed exceeds the maximum allowable speed or falls outside the speed range, for example under 20 mph, the controller 102 may disengage automatic articulation control and/or may alert the operator by way of a communication signal 124 to indicator 126 that the automatic articulation feature is not activated or is disengaged, STEP 208. In addition to, or in combination with, the travel speed determination, the controller 102 may also receive a signal from transmission sensor 114, and, if the transmission is found to be outside of a particular gear or output ratio range, for example above gears 1-4, the system may again proceed to STEP 208 and disengage the automatic articulation and/or alert the operator. As used herein, the output ratio refers to a ratio of the rotational speed upstream of the transmission to an output speed from the transmission.

At STEP 210, the controller 102 receives an input signal indicative of steering angle and articulation angle from, for example, steering angle sensors 104 and articulation sensor 108. At STEP 212 the controller 102 employs the inputs from STEP 210 to determine a desired articulation angle based upon front wheel steering.

For example, as illustrated in FIG. 3, during front wheel steering, each of the front wheels 58,60 has a separate turning radius, left front wheel 60 having a turning radius $R_1$ and right front wheel 58 having a turning radius $R_2$ from origin O. Steering angle θ may be based upon either a steering angle for the right front wheel 60 or left front wheel 58. However, in one embodiment, a centerline steering angle $θ_c$ may be calculated by controller 102 that is an average of right and left steering angles in the event that some variation or error exists based upon, for example, wheel misalignment or sensor errors.

The tandem arrangement of rear tires 22 behaves equivalently to a machine including a single wheel on each side of the machine, the hypothetical wheel being disposed at the center of each tandem 24. Thus, the automatic articulation algorithm may be configured such that a rear centerline point 82, a point 82 disposed equidistant from a midpoint of the two opposing tandems 24, will track the front centerline point 84 between the pivot points 80 of the front wheels 58,60. That is, a front centerline point 84 being a midpoint of a line connecting the pivot points 80 of the right and left front wheels 58,60 (FIG. 3).

The turning radius at the front centerline point 84 of the front frame 12, $R_c$, is given by equation (1):

$$R_c = (L_2 + L_1 \cos α)/(\sin(θ_c + α))$$

wherein $L_1$ is the distance between articulation joint 62 and front centerline point 84, $L_2$ is the distance between articulation joint 62 and rear centerline point 82, and α is the articulation angle.

The turning radius at the centerline point 82 of the rear tandem, $R_r$, is given by equation (2):

$$R_r = ((L_2 + L_1 \cos α)/(\tan(θ_c + α))) + L_1 \sin α$$

Figure 7:
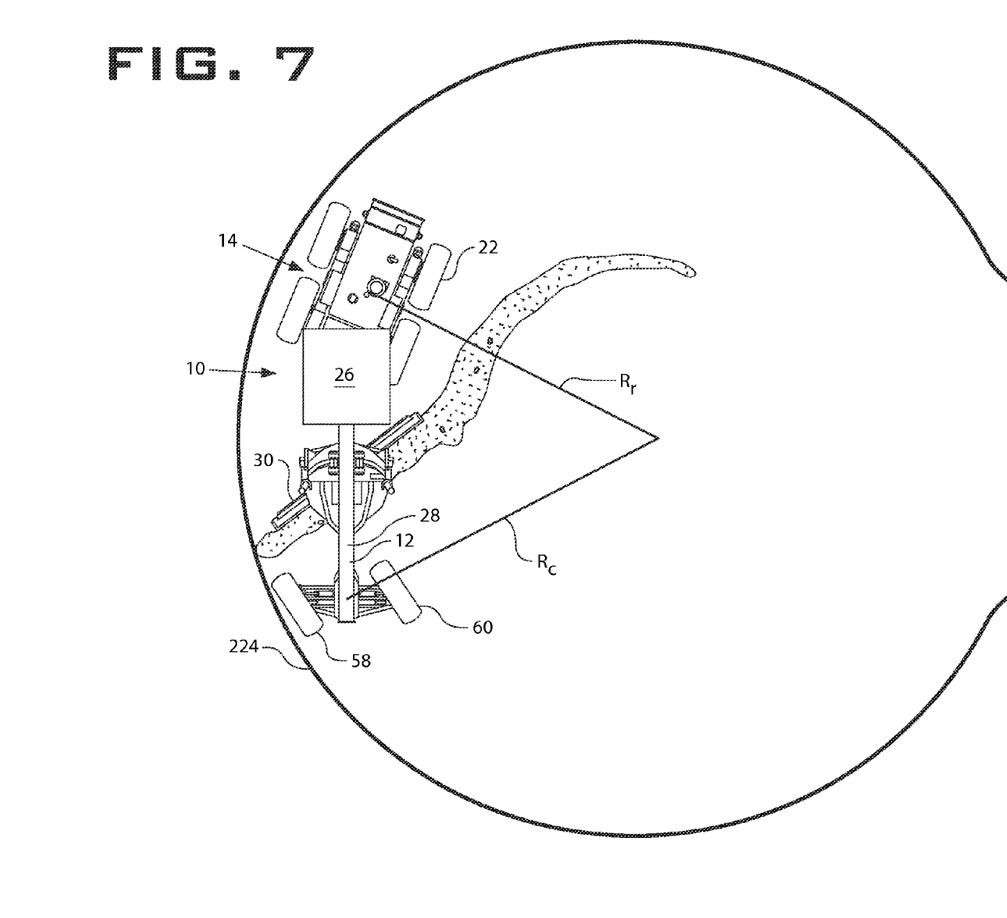
FIG. 7 is a pictoral representation of an exemplary motor grader operation employing a steering control system in accordance with the disclosure.

The controller receives an indication of the front wheel steering angle and commands an articulation angle that will cause $R_c$ and $R_r$ to be equivalent, thus causing the rear tires 22 to follow the track of the front tires 58,60 as shown in FIG. 7 as the motor grader moves around a curve. Using one equation, for example, the controller may solve for a desired articulation angle for a given steering angle as given by equation (3):

$$\alpha = \arctan\left(\frac{(L_1^2 - L_2^2)\sin(\theta_c)}{(L_1^2 + L_2^2)\cos(\theta_c) - 2L_1 L_2}\right)$$

If there is a needed adjustment of articulation angle α the controller 102 may proceed to STEP 214 or STEP 220, or, if no adjustment is needed, the system may continue monitoring at STEP 210 as shown.

It should be appreciated by one of skill in the art that this equation may be modified, for example, to employ a radius from other points on the machine, for example, by using a first radius from pivot point 80 of the left front tire 60 to track a point associated with a rear tire 22 on the left tandem, L1 and L2 being adjusted accordingly. In an alternative embodiment, the controller 102 may be provided with one or more maps or look-up tables that include pre-determined relationships between steering angle θ and articulation angle α based upon known machine geometries. Such look-up-tables or maps may be pre-made and stored in or downloaded into the memory of controller 102.

At STEP 214, due to the geometries of a particular motor grader 10, automatic tracking of the front and rear wheels may not be possible for all steering configurations. That is, the front wheels 58,60 may be able to achieve a steering angle θ that exceeds what can be commanded by the automatic articulation function based on the capable articulation angle α. For example, when the rear frame 14 is at a maximum articulation angle of 20 degrees, the front wheels can only turn to approximately 18 degrees and still have the same turning radius as the rear frame. This might be, for example, only about 36% of the full front wheel steering capability of, for example, 49.5 degrees.

Accordingly, in one embodiment, the system includes a steering limiter, the automatic articulation with steering limiter mode, that operates to restrict the maximum allowable steering angle θ of the front wheels to within the articulation capabilities of the machine. This acts to ensure that when the operator has engaged the automatic articulation feature, the rear frame 14 will always be tracking the front frame 12.

Figure 5:
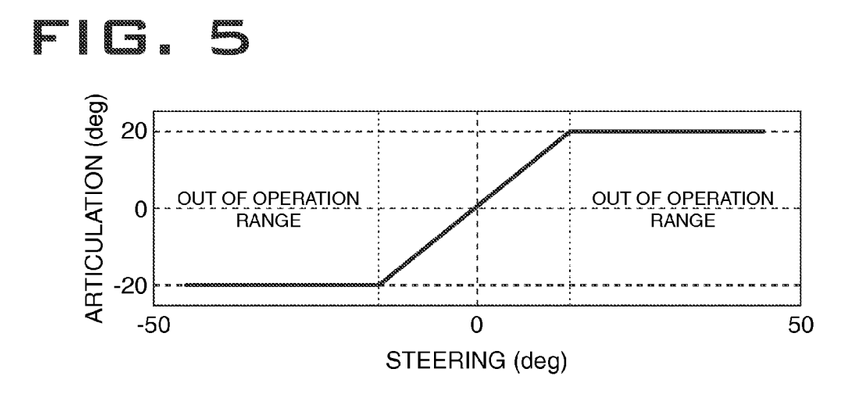
FIG. 5 is a graphical representation of exemplary operating ranges for one embodiment of the disclosed steering control system.

FIG. 5 is a graphical representation of steering angle θ versus articulation angle α for an exemplary motor grader 10. This will be based upon, for example, the dimensions of the front and rear frame sections 12,14, selected centerline positions 82, 84, wheel base, etc. In the example shown, the motor grader allows for a +/−50 degree steering angle θ, however, an allowable articulation angle of only +/−20 degrees. In one embodiment, when the operator has selected the automatic tracking with limiter mode, if the operator commands a steering angle θ that falls outside of the range of operation, the controller 102 will STEP 216 command a maximum articulation angle α, via control signal 122, and automatically limit the actual front wheel steering angle θ, via control signal 118, to one that corresponds to the maximum allowable articulation angle α. The system may also, at STEP 218, provide a communication signal 124 to an indicator 126, alerting the operator that the maximum steering angle θ has been exceeded, and that front wheel steering has been limited.

In an alternative embodiment, instead of limiting automatically the steering angle θ, the system may simply provide an indicator 126 via, for example, communication signal 124 to a display or warning light in the operator station that the articulation threshold has been exceeded. This allows the operator the flexibility to steer beyond the maximum achievable articulation, without having to disengage the automatic articulation feature.

At STEP 220, the controller will provide articulation control signals 122 to control articulation cylinders 64,66 in accordance with the desired articulation angle α based upon the determinations of either steps 212 or 214. While the controller is commanding articulation, the system may also provide a positive indicator 126, such a green light or other indicator 126 that automated articulation control is functioning. The rate at which articulation occurs may be based upon, for example, the travel speed of the machine, provided again by speed sensor 112, which may be compared to one or more tables or maps provided to the controller 102. The controller 102 may then be configured to provide signal 122 to command both a desired articulation angle α and a rate of movement of actuators 64,66, by, for example, controlling a flow rate associated therewith. In one embodiment, for example, the speed at which articulation occurs increases as the travel speed of the machine increases.

In yet another embodiment, it may be desirable to provide a delay before automatic articulation is engaged. This provides a buffer period to allow the operator to make minor adjustments to machine position before automatic articulation occurs. For example, the system may include an engagement delay based on a distance traveled calculated by the controller 102 based on machine travel speed from speed sensor 112 and known traction device geometries. Alternatively, delay may be based on a simple timer, automated articulation control engaging, for example, 30 seconds after the mode is selected.

In final STEP 222, the operator may use the mode selector to turn off either of the automatic articulation modes. In an alternative embodiment, automatic articulation may be disengaged when the machine is within a certain range of a neutral position wherein both the articulation angle and front wheel steering angles approach zero, when the machine exceeds a designated travel speed, a particular gear or gear ratio, the machine is placed in reverse, brakes are applied, the operator commands articulation manually, or the machine is stationary for a given period of time.

INDUSTRIAL APPLICABILITY

The present disclosure relates generally to a method of improving steering control for an articulated machine having front wheel steering. In particular, the system has application for work equipment such as motor graders wherein the operator needs to closely control a variety of complex machine functions, such as blade control, while maneuvering the machine in a curved trajectory. In general, the disclosed systems receive steering commands from the operator, and, based upon the steering command or signals indicative of front wheel steering angle, automatically command articulation so that the front wheels track the rear wheels of the machine. This has particular application in connection with cul-de-sac operations such as that depicted in FIG. 7, wherein the operator uses front steering control to guide the machine around the cul-de-sac while operating the blade 30 to achieve the desired grade, the automatic articulation function controlling articulation of the rear frame 14 to avoid striking obstacles such as curb 224.

It should be understood that the above description is intended for illustrative purposes only. In particular, although the systems described herein are illustrated in the context of a motor grader 10, those skilled in the art will appreciate that the teachings of the present disclosure may be applicable to other types of mobile machinery having front steering in combination with articulation. It should also be appreciated that all methods described herein can be performed in any suitable order unless otherwise indicated herein or otherwise clearly contradicted by context.

While aspects of the present disclosure have been particularly shown and described with reference to the embodiments above, it will be understood by those skilled in the art that various additional embodiments may be contemplated by modification of the disclosed machines, systems and methods without departing from the spirit and scope of what is disclosed. For example, although one set of calculations has been described by which automatic articulation may be achieved, other suitable calculations may be performed by algorithms designed to achieve the desired functionality and may be employed by those of skill in the art. Such embodiments should be understood to fall within the scope of the present invention as determined based upon the claims below and any equivalents thereof.

What is claimed is:

1. An articulated machine, comprising:
    a first frame having a first traction device and a steering apparatus operable to control a steering angle of the first traction device;
    a second frame pivotally coupled to the first frame at an articulation joint, the second frame having a second traction device;
    a steering sensor configured to provide a steering signal indicative of the steering angle; and
    an electronic controller configured to automatically control an articulation angle of the first frame relative to the second frame based on the steering signal, wherein the electronic controller is configured to limit the steering angle of the first traction device based on a maximum articulation angle.

2. The articulated machine of claim 1, wherein the controller is configured to command an articulation angle to conform a turning radius of the first frame to a turning radius of the second frame.

3. The articulated machine of claim 2, wherein the first traction device includes a first wheel and a second wheel disposed on opposing sides of the first frame, and the turning radius of the first frame is defined by a point equidistant between the first wheel and the second wheel.

4. The articulated machine of claim 3, wherein the second traction device includes a first wheel and a second wheel disposed on opposing sides of the second frame, and the turning radius of the second frame is defined by a point equidistant between the first and second wheels of the second frame.

5. The articulated machine of claim 3, wherein the second traction device includes a first tandem and a second tandem pivotally connected on opposing sides of the second frame, and the turning radius of the second frame is defined by a point equidistant between a pivotal connection of the opposing first and second tandems.

6. The articulated machine of claim 1, further comprising an articulation sensor configured to provide an articulation signal indicative of an articulation angle, the controller further configured to control the articulation angle based on the articulation signal.

7. The articulated machine of claim 1, wherein the controller is configured to provide a communication signal to an operator indicator when the steering angle exceeds a maximum steering angle allowable based on a maximum articulation angle.

8. The articulated machine of claim 1, further comprising a mode selector that provides a mode signal to the controller selecting between an automatic mode, wherein control of the articulation angle by the controller is based on the steering angle, and a manual mode wherein the articulation angle and the steering angle are manually controlled.

9. The machine of claim 8, further comprising a powertrain sensor configured to monitor machine speed, wherein the automatic mode is disengaged when the machine speed is above a desired machine speed.

10. The machine of claim 8, further comprising a transmission sensor configured to monitor a transmission output ratio or gear selection, wherein the automatic mode is disengaged based upon the output ratio or gear selection.

11. The articulated machine of claim 1, wherein the controller is configured to control the articulation angle by calculating a desired articulation angle at which a turning radius of the first frame equals a turning radius of the second frame based on the steering angle, and responsively commanding an actuator to the desired articulation angle.

12. The articulated machine of claim 1, wherein the controller is configured to employ the steering signal in connection with one of a table or map to command the articulation angle.

13. The articulated machine of claim 1, wherein the first traction device includes a first wheel and a second wheel disposed on opposing sides of the first frame, the machine having a first steering sensor associated with the first wheel and a second steering sensor associated with the second wheel, wherein the steering angle is an average steering angle calculated by the controller based on signals received from the first and second steering sensors.

14. A method of operating a motor grader having steerable front wheels and a front and rear frame pivotally connected at an articulation joint, comprising:
    selecting an automatic articulation mode; propelling the motor grader along a direction of travel;
    commanding front wheel steering to turn the motor grader; and providing a front wheel steering signal to an electronic controller, the electronic controller automatically commanding articulation of the front frame relative to the rear frame about the articulation joint in response to the front wheel steering signal, wherein the front wheel steering signal is indicative of a front wheel steering angle and the front wheel steering angle is limited based upon a maximum allowable articulation angle.

15. The method of claim 14, wherein the controller being configured to command an articulation angle that conforms a turning radius of the front frame to a turning radius of the rear frame based upon the steering angle.

16. The method of claim 14, wherein the controller derives the commanded articulation by comparing the front wheel steering angle to a table or map stored in a memory of the controller.

17. The method of claim 14, further comprising providing a travel speed, transmission gear, or transmission output ratio signal to the controller, the controller determining whether or not to command articulation based upon the travel speed, transmission gear or transmission output ratio.

18. A motor grader, comprising:
    a front frame having a first and second steerable wheel disposed on opposing sides of the frame;
    a rear frame pivotally coupled to the front frame at an articulation joint, a first and second articulation cylinder disposed between the front and rear frames in opposing orientation, the rear frame having a tandem with two rear wheels pivotally connected on opposing sides of the rear frame;

a steering sensor configured to provide a steering signal indicative of a steering angle of the first and second steerable wheels; and an electronic controller configured to automatically command the first and second articulation cylinders to control an articulation angle of the first frame relative to the rear frame based on the steering angle, wherein the controller is configured to limit the steering angle of the first and second steerable wheel based on a maximum articulation angle.

* * * * *